Sept. 8, 1970     R. E. NATHER     3,527,929
STATISTICAL ERROR COMPUTING APPARATUS
Filed Dec. 9, 1966     5 Sheets-Sheet 1

INVENTOR.
ROY E. NATHER
BY T E Kristofferson
ATTORNEY

INVENTOR.
ROY E. NATHER
BY T E Kristofferson
ATTORNEY

Sept. 8, 1970
R. E. NATHER
3,527,929
STATISTICAL ERROR COMPUTING APPARATUS
Filed Dec. 9, 1966
5 Sheets-Sheet 5
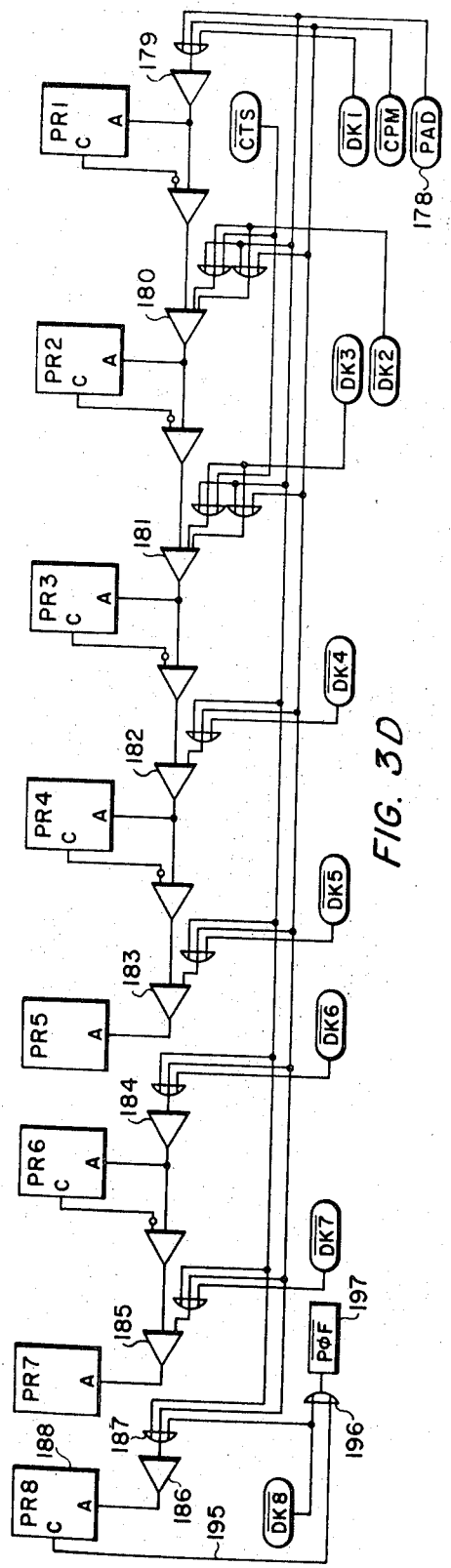
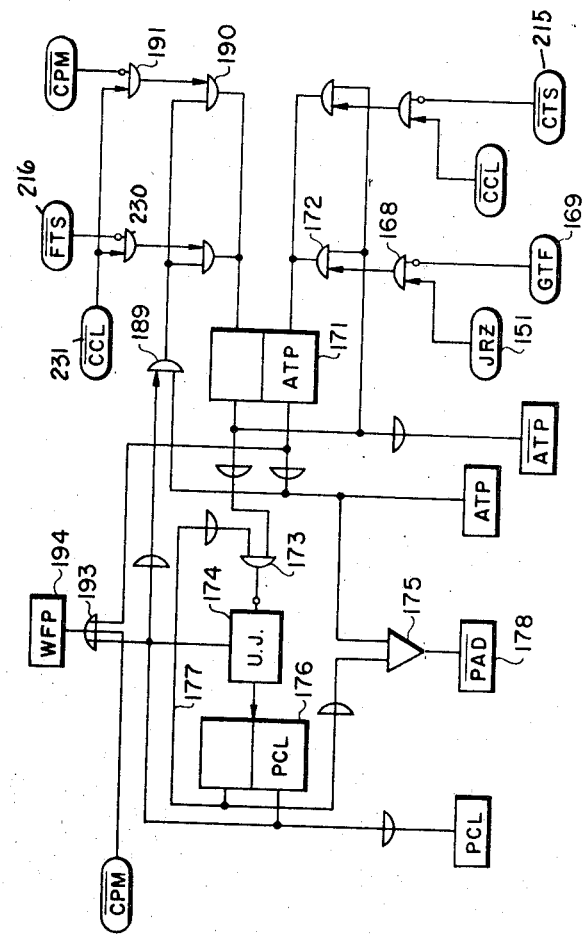
*INVENTOR.*
ROY E. NATHER
BY
ATTORNEY United States Patent Office 3,527,929
Patented Sept. 8, 1970

3,527,929
STATISTICAL ERROR COMPUTING APPARATUS
Roy E. Nather, Solana Beach, Calif., assignor to Beckman Instruments, Inc., a corporation of California
Filed Dec. 9, 1966, Ser. No. 600,596
Int. Cl. G06m 11/00, 3/06
U.S. Cl. 235—92                                    7 Claims

ABSTRACT OF THE DISCLOSURE

An improved statistical error computing apparatus for use in data reduction systems for radiation counting equipment for example. The apparatus uses a counter to store information on the range of statistical error for live display and print-out. As counts are accumulated, the information in this counter is updated rather than continuously recomputed and may be displayed live on a meter if desired. Counting decoding is used for transferring the information in the counter into a printer register for printing out the percent error after accumulation is completed.

CROSS-REFERENCES TO RELATED APPLICATIONS

This case is a modification of a copending application of R. E. Nather, Ser. No. 540,603, filed Apr. 6, 1966, entitled "Statistical Evaluation System," and assigned to the assignee of the present invention. Also, circuitry which may be employed in carrying out the invention herein is disclosed in a copending application of R. E. Nather, Ser. No. 585,333, filed Oct. 10, 1966, entitled "Improved Data Reduction System for Radiation Counting Equipment," also assigned to the assignee of the present invention.

BACKGROUND OF THE INVENTION

This invention relates to statistical error computing apparatus and more particularly to such apparatus capable of establishing and displaying statistical error as counts are accumulated in applications such as radiation counting equipment.

Prior art radiation accumulation instruments often provide some data reduction ability in order to present the user with data in as near final form as feasible. A common data reduction operation divides accumulated counts, or detected radiation events, by counting time in order to provide counts-per-minute (CPM). This is a direct measure of radiation intensity. In the usual manner of performing this calculation, the total number of counts accumulated and the reliability are lost since the reliability of the measurement is a function of the total number of the counts collected. If no further information is provided, other than CPM, the output is virtually useless. Prior art devices have provided the user with the unreduced total number of counts as well as CPM, from which he could compute a measure of the statistical reliability of his data. Probably the most common measure of this reliability or statistical error is given by the equation $$E = \frac{2}{\sqrt{N}}$$

where E is the fractional error and N is the total number of events accumulated. This is called the two-sigma ($2\sigma$) error. Automatic equipment for calculating such an error on signal or demand is disclosed in the system of the referenced application Ser. No. 540,603, which clears the circuitry and calculates $2\sigma$ independently, starting from the beginning, at brief intervals on command, rather than retaining the information previously calculated and adding to it.

Direct calculation of the error value is difficult to perform simply since a square-root operation is required. Exact calculation is, fortunately, rarely required and an approximation of the value is usually sufficient. Few investigators are concerned over the error of the error.

SUMMARY OF THE INVENTION

Accordingly, it is one object of this invention to provide simple apparatus for performing additional data reduction capability to yield a direct live indication and display of the reduced statistical reliability of the data during accumulation by continually updating the stored results of the previous calculation of the percent error range without completely recalculating.

Another object of the invention is to provide for printing out the percent error after accumulation by counting decoding to transfer the stored value to a printer register.

These and other objects are achieved by providing an automatic statistical percent error computing apparatus including a scaler for accumulating counts, the statistical error of which is to be classified in percent error ranges which decrease in value as the number of counts increase, characterized by output connections from the scaler from points representative of the appropriate boundaries of the ranges, decoding means for deriving preset error pulses on reaching each boundary only for the first time, a counter for accumulating the preset error pulses to store a representation of the instantaneous preset error range, and output decoding means connected from the counter to an output for displaying the instantaneous percent error range or printing. In a preferred embodiment, the output decoding means uses digital counting decoding.

The novel features which are believed to be characteristic of the invention are set forth with particularity in the appended claims. The invention, and further objects and advantages thereof, can best be understood by reference to the following description and accompanying drawings.

BRIEF DESCRIPTION OF THE DRAWINGS

FIGS. 3A through 3E each represent a portion of a logic diagram of a preferred embodiment of the invention in greater detail, as follows:

FIG. 3A: the I counter with decoding and control;
FIG. 3B: the scaler and preset error pulse generation;
FIG. 3C: the J and K counters with decoding and control;
FIG. 3D: the printer register; and
FIG. 3E: the printer register drive.

DESCRIPTION OF THE PREFERRED EMBODIMENT

Figure 1:
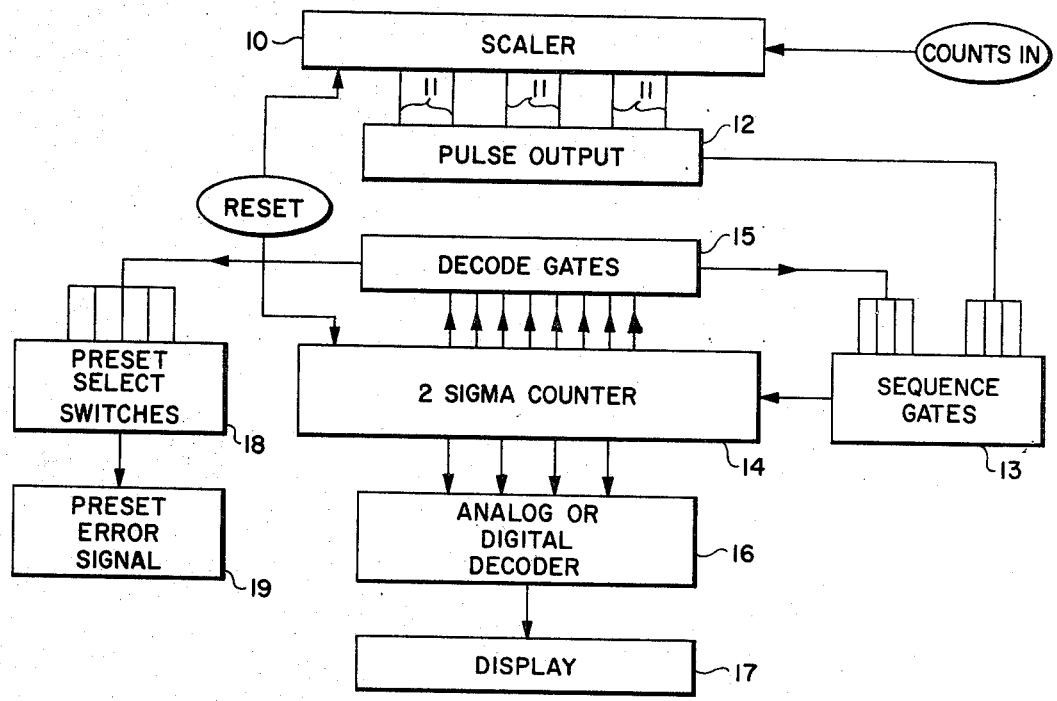
FIG. 1 is a block diagram of a system for accumulating an encoded $2\sigma$ value, in accordance with the invention.

Turning now to the drawings, in FIG. 1 there is shown in block diagram form a system for accumulating an encoded $2\sigma$ value based on the total number of events counted by a scaler 10. Pulse outputs are obtained from various points in the scaler over the output connections 11 so that when the selected number of events has been accumulated, an output pulse is delivered from a pulse output network 12 to a group of sequence gates 13. The number of counts corresponding to different error values is given in Table I below:

TABLE I

| Number of counts: | Two sigma error (percent) |
|---|---|
| 0–99 | Over 20 |
| 100–199 | 20 |
| 200–399 | 15 |
| 400–799 | 10 |
| 800–1,599 | 7 |
| 1,600–3,999 | 5 |
| 4,000–9,999 | 3 |
| 10,000–19,999 | 2 |
| 20,000–39,999 | 1.5 |
| 40,000–79,999 | 1 |
| 80,000–159,999 | .7 |
| 160,000–399,999 | .5 |
| 400,000–999,999 | .3 |
| 1,000,000 and over | .2 |

In all, thirteen error values of $2\sigma$ are selected, in addition to some indication that the error is too large to provide an accurate value, here fewer than 100 events, or over 20% error. This provides a required total of fourteen possible output values. The states of $2\sigma$ counter 14 can be made to correspond to these output values, as shown in Table II below.

Four flip-flops are required to provide sixteen stable states, two of which are not used. The counter 14 is initially set to 0001, rather than 0000, in order to provide a convenient output signal following the 3% error state, at which time the high order flip-flop of counter 14 changes state from a "zero" to a "one" and the output numbers required repeat a sequence to be pointed out subsequently.

TABLE II

| $2\sigma$ Binary | $2\sigma$ Decimal | Output Numbers Required | Differences | | Add |
|---|---|---|---|---|---|
| 0001 | 1 | 00.0 | | ↑ | |
| 0010 | 2 | 20.0 | 5.0 | | 5 |
| 0011 | 3 | 15.0 | 5.0 | Flip-flop F4 false | 5 |
| 0100 | 4 | 10.0 | 3.0 | | 3 |
| 0101 | 5 | 7.0 | 2.0 | | 2 |
| 0110 | 6 | 5.0 | 2.0 | | 2 |
| 0111 | 7 | 3.0 | 1.0 | ↓ | 1 |
| 1000 | 8 | 2.0 | .5 | ↑ | 5 |
| 1001 | 9 | 1.5 | .5 | | 5 |
| 1010 | 10 | 1.0 | .3 | Flip-flop F4 true | 3 |
| 1011 | 11 | 0.7 | .2 | | 2 |
| 1100 | 12 | 0.5 | .2 | | 2 |
| 1101 | 13 | 0.3 | .1 | | 1 |
| 1110 | 14 | 0.2 | (.2) | ↓ | 2 |

If the scaler 10 is wired to provide pulsed outputs after 100, 200, 400, etc. events, as set out in Table I, provision must be made to respond to each pulse only once. By the time 400 events have been accumulated, the output from the 100 count point on the lowest order one of the connections 11 will have provided four pulses. Only the first of these must be counted by the $2\sigma$ counter 14. Decode gates 15 provide signals in such a manner that the $2\sigma$ counter 14 will respond to the 100 count pulse only when it is in the 0001 condition. This pulse, when it arrives, advances the counter 14 to the 0010 state, which enables a gate in the sequence gates 13, allowing the 200 event pulse to be counted, and disables a gate in the sequence gates 13 which allowed the counter to respond to the 100 event pulse.

Judicious selection of the scaler pulse output connections 11 allows an excellent approximation to the required square-root function with very simple circuitry. The $2\sigma$ counter 14 provides an inexpensive encoded value of the error. Analog or digital decoding, provided by the analog or digital decoder 16, can provide a direct live display of the value on display mechanism 17. Further, the decode gates 15 can also be utilized in conjunction with preset select switches 18 to provide a preset error signal output 19, which will allow the over-all equipment to be preset to obtain a desired statistical reliability in the result, using the signal 19 to stop accumulation when the desired value has been obtained.

If the display device 17 is one in which normal logic levels determine a printed character, standard DC diode or transistor gating can be used in decoder 16 to translate the $2\sigma$ counter state into the desired output characters. In the event the display 17 is a printing register however, a large savings in gating components in decoder 16 can result by utilizing dynamic or counting decoding in accordance with the invention. In the special case where a count of five circuit is required for other operations such as CPM calculation, for example, as disclosed in the referenced application Ser. No. 585,333, wherein the J counter (38) provides such a device which can be made available for dynamic decoding, the savings in components is further increased. The dynamic decoding method is further described hereinbelow in connection with J and K counters illustrated in FIG. 3C.

Figure 2:
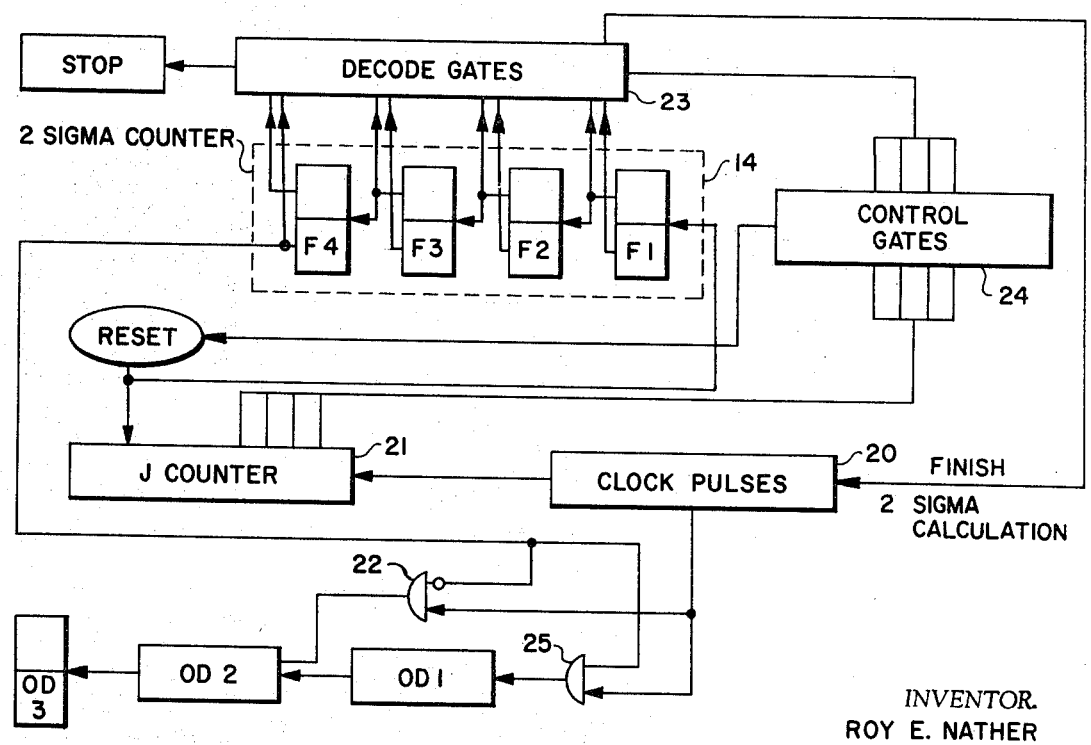
FIG. 2 is a block diagram of a configuration for translating an encoded $2\sigma$ value into output characters by counting, in accordance with the invention.

FIG. 2 shows, in block diagram form, a configuration for translating the encoded $2\sigma$ value in counter 14 into output characters by counting after accumulation is over. Table II shows, in columnar form, the output numbers required. The output for greater than 20% is chosen to be zeros and special logical provisions, skipping the translation step entirely, must be made when this condition is encountered. For any state of the $2\sigma$ counter 14 except 0001, using the same numerals in FIG. 2 as in FIG. 1 where appropriate, the counting process is used to effect the translation. Note also that the state 1111 is not used and cannot be reached during the accumulation process.

A column of differences is shown in Table II and these can be seen to fall into two repeating groups, considering only the integers involved and ignoring their position with respect to the decimal point. The final difference at the bottom, shown in parentheses (.2), is the difference in the smallest error encountered (.2%) and zero. Since the accumulation of the $2\sigma$ value, as in FIG. 1, proceeds by counting the $2\sigma$ counter 14 forward, the translation process, to be most economical, should cause the counter 14 to count in the same direction. The desired output can be thought of as an encoded complement of the stored value, that is, as the number of the input counts increases during accumulation, the required size of the output number decreases.

The last column in Table II shows the number of counts which are added into the output register OD1–OD3 for each position of $2\sigma$ counter 14 during the output translation process. As shown in FIG. 2, clock pulses from a source of clock pulses 20, of a rate slow enough to advance the output counters OD1, OD2 and OD3 properly, enter a J counter 21 and either counter OD1 or OD2, depending on the state of the fourth flip-flop F4 in $2\sigma$ counter 14. As as example, assume the $2\sigma$ value to be printed is 15%. In this case, the $2\sigma$ counter 14 is initially in the state 0011, as can be seen from Table II. Therefore, flip-flop F4 is false, false-enabling gate 22 as indicated by the small circle on its input lead, and clock pulses will enter counter OD2. The decode gates 23 from the counter 14 provide levels to the control gates 24, which in turn dictate that five clock pulses must enter the J counter 21 and also counter OD2 before an output is obtained. When five clock pulses have been metered into counters 21 and OD2, an output pulse is obtained from the control gates 24, which causes a reset pulse to reset the J counter 21 to its initial state and also to advance the $2\sigma$ counter 14 to the next state 0100. Now, referring to Table II, only three clock pulses will enter the J counter 21 and counter OD2 before the control gates 24 output occurs causing advance to state 0101 of counter 14 and reset of the J counter 21 to its initial state. Next, two pulses are added, then two more in state 0110. Then one pulse in state 0111. A total of thirteen pulses have now been entered into counter OD2 with a carry occurring into counter OD3 on the tenth pulse, and as counter 14 advances to state 1000, flip-flop F4 goes true, closing the gate 22 into counter OD2 and opening a gate 25 into counter OD1. Proceeding as before, adding the pulses into counter OD1 and counter 21 and advancing to the next state as indicated by the values of Table II, a total of twenty pulses will be added into counter OD1 before state 1111 of counter 14 is reached, which signals the end of the process by a pulse from the decode gates which turns off the clock pulses 20 indicating finish of the $2\sigma$ calculation. Carry pulses from counter OD1 into counter OD2 result in a final value in the register, including counters OD1, OD2 and OD3 of 150 which, with a decimal point inserted, is the number we want it to print. Correspondingly, starting at any initial value in the $2\sigma$ counter 14, the sum of the pulses added to the output register, taking into account the gates 22 and 25 as controlled by flip-flop F4, results in the number which is desired to be printed.

Turning now to FIG. 3, we see the invention illustrated by FIGS. 1 and 2 embodied in the special case CPM calculation configuration mentioned hereinbefore and is the same detailed embodiment illustrated in the above referenced copending application Ser. No. 585,333. The same numerals are used to designate parts in common with the prior docket and the same logic and terminology conventions are employed.

It is helpful to further clarify the present invention as it is embodied in the CPM calculation configuration of FIG. 3.

Figure 3A:
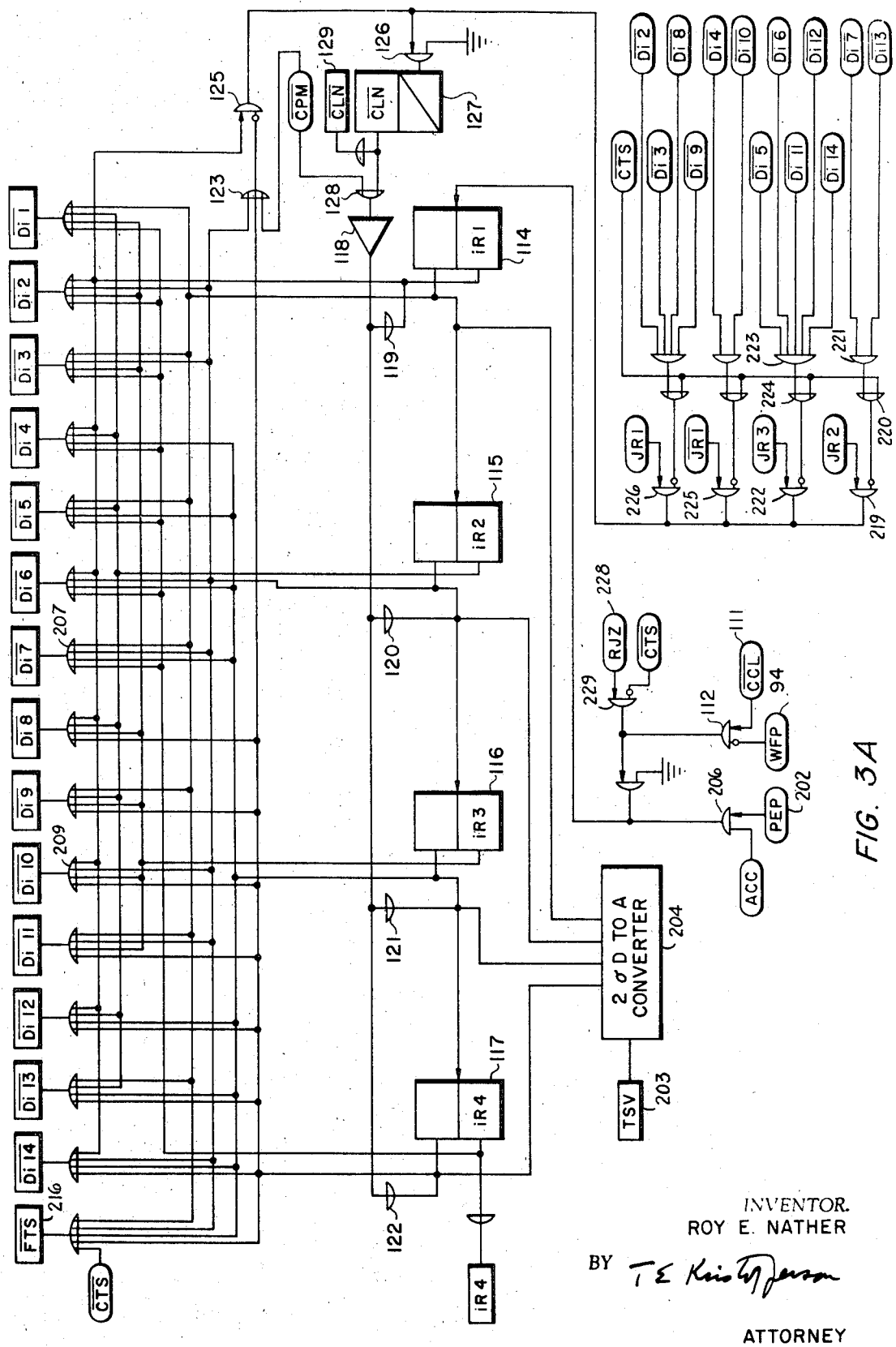
Figure 3B:
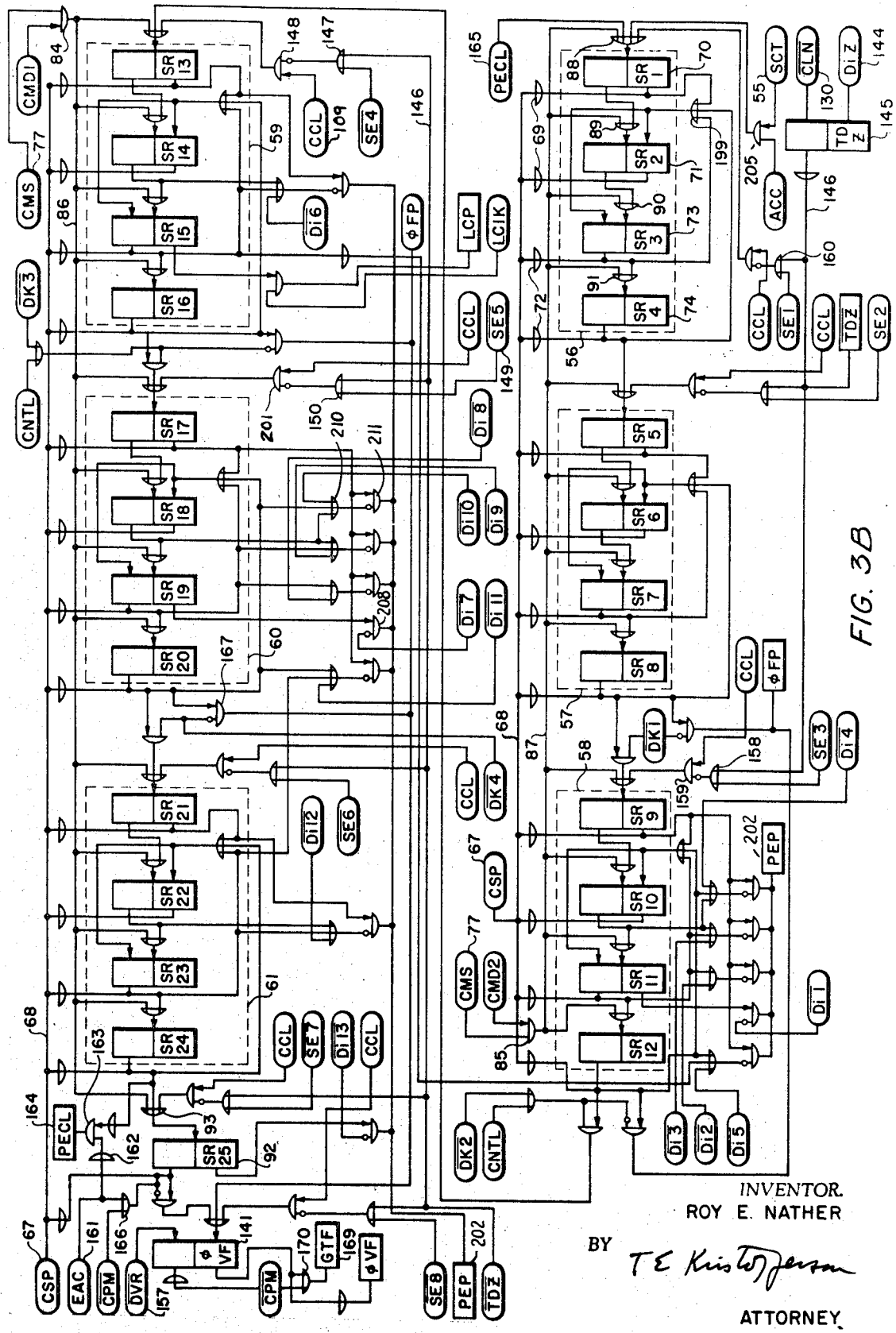

The scaler 10, pulse output 12 and sequence gates 13 of FIG. 1 are embodied in the scaler of FIG. 3B. The flip-flops SR1 through SR25 of the scaler register of FIG. 3B form the scaler 10 and pulse output 12 of FIG. 1. The sequence gates 13 of FIG. 1 are typically illustrated by such gates as 208, 210 and 211 of FIG. 3B. The output into the $2\sigma$ counter from sequence gates 13 of FIG. 1 is identical to output PEP-202 (outputs are rectangles, inputs are ovals) of FIG. 3B.

The $2\sigma$ counter 14 of FIGS. 1 and 2 consists of the flip-flops 114–117 of FIG. 3A and identified as the I counter. The gates typically illustrated by 207 and 209 and having outputs $\overline{Di1}$ to $\overline{Di14}$ are equivalent to the decode gates 15 and 23 of FIGS. 1 and 2. The control gates 24 of FIG. 2 appear in FIG. 3A illustrated typically as gates 217–226, which have inputs from the decode gates ($\overline{Di1}$ to $\overline{Di14}$) and the J counter (JR1, JR2, JR3 and $\overline{JR1}$) as well as a command input $\overline{CTS}$, to "count $2\sigma$."

Figure 3C:
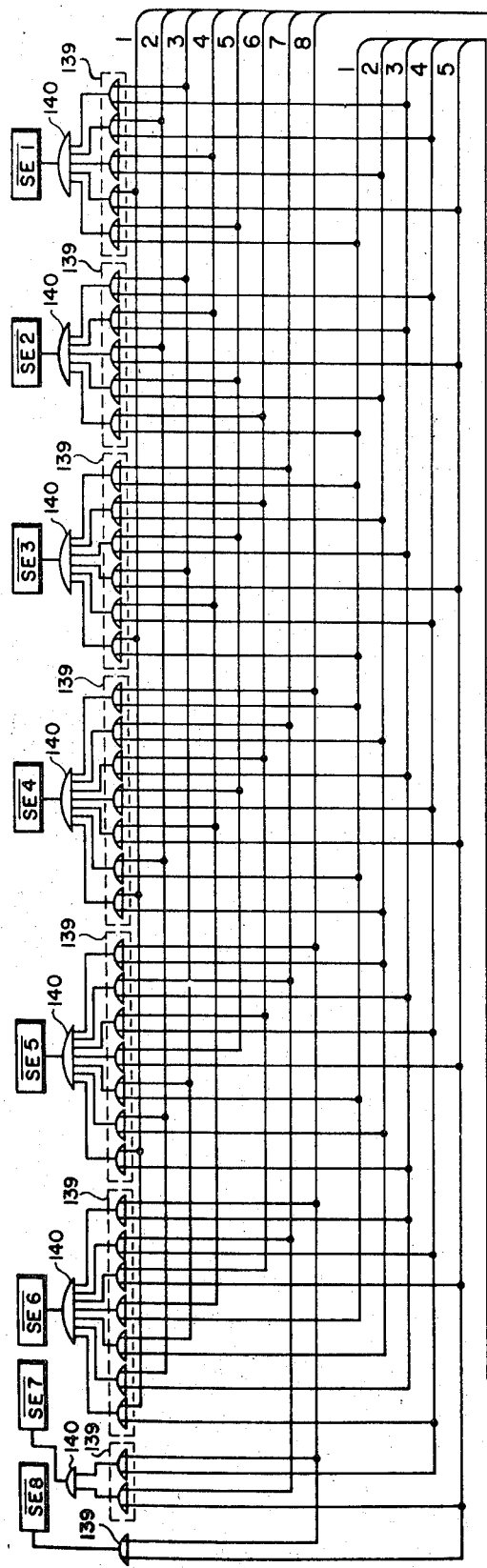
Figure 3C:
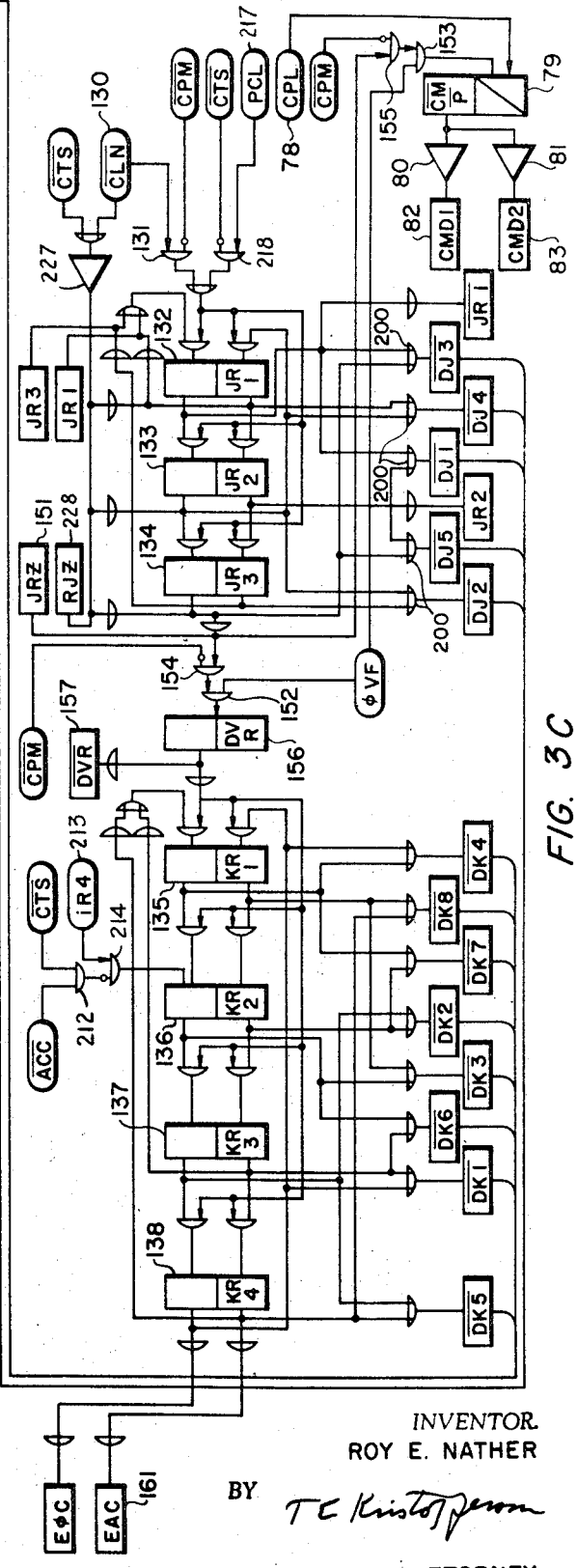

The J counter 21 of FIG. 2 is illustrated by flip-flops 132, 133 and 134 in FIG. 3C. Although other outputs are shown for use in the CPM calculation, particular attention is called to those consisting of $\overline{JR1}$, JR1, JR2 and JR3.

The function of gates 22 and 25 of FIG. 2 is performed by the K counter of FIG. 3C illustrated by flip-flops 135 to 138. The input iR4-213 is the same as that input to gate 22 and 25 coming from F4 in FIG. 2. The outputs of interest in FIG. 3C from the K counter are $\overline{DK2}$ and $\overline{DK3}$. The other outputs are used in the CPM calculation.

The output counters OD1, OD2 and OD3 of FIG. 2 are equivalent to the P counter or printer register decades PR2, PR3 and P4 of FIG. 3D. The inputs $\overline{DK3}$ and $\overline{DK2}$ control the entry point of pulses from input $\overline{PAD}$-178 to the decades PR2 or PR3. The outer inputs and decades illustrated in FIG. 3D are used in the CPM calculation.

The clock pulses 20 of FIG. 2 is embodied in the P-clock configuration of FIG. 3E. The outputs of interest are PCL and $\overline{PAD}$-178. The inputs of interest are the "count $2\sigma$" $\overline{CTS}$ and "finish $2\sigma$" $\overline{FTS}$. The other inputs and outputs illustrated are used in the CPM calculation.

Several input commands or controls which appear in FIG. 3 are derived from sources not illustrated. Since they control the various functions of the present invention, they are identified as follows. ACC is the accumulate command which designates when sample counts SCT are to be accumulated by the scaler. CTS is the command to "count $2\sigma$" and is true when $\overline{CTS}$ is false. All other inputs which are not identified or associated with outputs elsewhere in the drawings are related to the CPM calculations.

Therefore, it is apparent that FIG. 3 illustrates an embodiment of the invention illustrated in FIGS. 1 and 2 in apparatus for performing a CPM calculation. Although FIG. 3 includes many elements related to the CPM calculation, it should become apparent in the following detailed discussion which elements are important to the present invention.

The I counter in FIG. 3A, including the flip-flops 114–117, continuously accumulates the $2\sigma$ value in coded form by accumulating the preset error pulses PEP-202, produced by traversing each of the count intervals set forth in Table I, as they come from the scaler register of FIG. 3B during the accumulate step prior to the compute $2\sigma$ step. The I counter provides a $2\sigma$ voltage TSV for display on meter 203 from $2\sigma$ digital-to-analog converter 204 in FIG. 3A, which is necessary to produce a live display of the $2\sigma$ error on meter 203.

The J counter 21 of FIG. 2, illustrated in detail as part of the CPM configuration mentioned hereinabove by the flip-flops 132–134 in FIG. 3C, is used together with the decoded I counter position to control the compute $2\sigma$ operation. The K counter, including flip-flops 135–138 in FIG. 3C, is used to select the entry points $\overline{DK2}$ or $\overline{DK3}$ on the printer register of FIG. 3D during the compute $2\sigma$ operation performing the same function as gates 22 and 25 in FIG. 2. The reason for using the K counter to select the entry points is that it is utilized in the CPM calculation and is therefore available for use during the count $2\sigma$ operation.

During count accumulation into the scaler of FIG. 3B, when the sample counts SCT-55 pass the "AND" gate 205 enabled by an accumulate signal ACC and through the "OR" gate 88 into the scaler, the PEP pulses 202 are generated in the scaler and are counted in the I register of FIG. 3A through the "AND" gate 206, which is enabled also by ACC. This is done to keep track of the accumulated $2\sigma$ value, both for display on the meter previously mentioned via the $2\sigma$ D to A converter 204, and to allow a given preset error to terminate the accumulation process.

The converter 204 solves the problem of converting the various states of the I counter where the $2\sigma$ value is accumulated into a voltage or current proportional to the value. This can be done in a well known manner with diode-gating and four resistors. When one of the flip-flops 114–117 has a "one" in it, the current is permitted to flow through its corresponding resistor and when it contains a "zero," diode-gating is used to shut that current off. The resistance values are selected in the ratios 1:2:4:8, with the highest resistance assigned to flip-flop 114 and the lowest to flip-flop 117. All the currents are then added together and a current proportional to the number stored in the I counter is obtained. The common line to meter 203, where all the currents are added together, has a low impedance.

The PEP pulses 202 are generated by the scaler of FIG. 3B, with the aid of the decoded I counter lines $\overline{Di1}$ to $\overline{Di13}$ of FIG. 3A, and are arranged so that the I counter will show the proper $2\sigma$ code configuration after the appropriate number of counts has been accumulated in the scaler. This is described in Table I. In order to accomplish this, pulsed outputs must be obtained from the scaler after 100, 200, 400, etc. counts. However, as previously mentioned, each of these outputs must only be counted once. When in position 0001 of the I counter, the 100 count pulse advances the register to position 0010. Then, the 200 count pulse and not the next 100 count pulse must advance the register to step 0011. Next, the 400 count pulse advances the register and not the next 100 or 200 count pulse. To accomplish this, the I counter is decoded into the lines $\overline{Di1}$ to $\overline{Di14}$. These lines are used to select which pulse will be counted. For instance, for state 0111 only the gate at 10,000 counts is enabled and the remaining gates are shut off since, in this case, $\overline{Di7}$ is false since all the inputs of "OR" gate 207 are false, false-enabling gate 208.

Since, as mentioned in the above referenced copending application Ser. No. 585,333, the decades of the scaler illustrated in FIG. 3B are coded in the excess 3 code, the number 10,000 would be reached upon the first count into the decade 60, prior to which the flip-flops SR17 and SR18 would contain a "one" and the flip-flops SR19 and SR20 would contain "zeros." Upon the receipt of the 10,000th pulse, the state of SR19 would change and a pulse would be transmitted through gate 208 to provide the required PEP–202 output pulse. All of the remaining gates connected to the PEP–202 outputs are true-inhibited by the remaining $\overline{Di}$ signals. The large number of gates associated with the decade 60 are required since, referring to Table I, there must be four possible PEP–202 output pulses derived from this decade, namely, 10,000, 20,000, 40,000 and 80,000 counts.

As another example, when going from 40,000 to 80,000 counts, the I counter is in the 1010 state. At this point, all of the inputs to "OR" gate 209 in FIG. 3A are false, yielding a false $\overline{Di10}$ output which goes as a false input into "OR" gate 210 in FIG. 3B. When the decade 60 counts a "five," the top of SR20 into "OR" gate 210 will be false; however, the top of SR18 will be true, inhibiting "AND" gate 211 since the content of the decade 60 is 1000 in the excess 3 code. Upon a count of 60,000, the decade contains 1001 and the top of SR18 again goes true through "OR" gate 210 to inhibit "AND" gate 211. Upon reaching 70,000, gate 211 is enabled, since the top of SR18 goes false; however, now the bottom of SR17 is false so no signal passes through the "AND" gate 211. Upon reaching 80,000 the bottom of SR17 goes true and passes through the "AND" gate 211 to provide a PEP–202 output since the gate is false-enabled, since both the tops of SR18 and SR20 are false as well as $\overline{Di10}$, providing a false output from "OR" gate 210. The PEP–202 outputs for the other $2\sigma$ values are generated in a similar manner. In this manner the contents of the I counter are updated by each PEP–202 to indicate a new percent error range in a continuous manner during accumulation without having to periodically completely recalculate the value of $2\sigma$ as done in the above referenced application Ser. No. 540,603.

The K counter of FIG. 3C was initially set to contain 1110 and that is where it should be for the $2\sigma$ calculation (CTS), after complete data accumulation providing that not more than 10,000 counts have been accumulated in the scaler. If more than 10,000 counts have been accumulated, the register will be in a position containing 1100. The reason for this will be explained subsequently. To obtain this situation a pulsed gate 212 into flip-flop 136 is enabled with $\overline{ACC}$ so that when $iR4$ out of flip-flop 117 in FIG. 3A goes true, the input $iR4$–213 will turn off KR2 through gate 214, leaving the K counter in the state 1100.

After accumulating pulses in the scaler, the contents of the printer or P register of FIG. 3D, which has previously been cleared, can either be printed out or a compute $2\sigma$ (CTS) step can be entered into. If less than one hundred counts have been received during the accumulation process, the I counter of FIG. 3A will still be in its initial state 0001, and $\overline{Di1}$ will be false with the $2\sigma$ error greater than 20%, in which case the compute $2\sigma$ step would be skipped and the print step would cause the P register to print out all zeros. If $\overline{Di1}$ is true and a $2\sigma$ value has been accumulated in coded form in the I counter, this must be decoded and the value stored in the P register for printing.

Excepting the greater than 20% value already referred to, there are thirteen possible $2\sigma$ values to be printed. Table II shows all of these, together with the actual numbers to be printed and a list of the differences between these numbers. As the number of PEP pulses accumulated in the I counter increases, the size of the number to be printed decreases. This reflects the fact that as more counts are accumulated the resulting error gets smaller, according to a square-root function. Since the final number must be counted into the P register, the invention employs a decoding method that also makes use of counting.

If the I counter is counted forward to 1110 and the P register counts along with it, the final number in the P register decreases as the number in the I counter increases, which is the desired direction even though it would not yield the correct number if the P register is counted one step forward each time one is added to the I counter. Starting at the bottom of Table II, the 0.2% value corresponds to I counter code 14 (1110). To obtain the right number in the P register corresponding to this code, two pulses must be added thereto. To arrive at the proper decimal point for printing, these pulses must be added to PR2. Then, each time that the I counter shows code 14, two pulses are added into PR2, the difference between 000.00 and 000.20, using five decades of the P register.

The next code up from the bottom of Table II is code 13 (1101) corresponding to the $2\sigma$ value of 0.3%. When the I counter shows this code, one pulse must be added to PR2, in addition to step 14 which will cause two pulses to be added to PR2 resulting in the three pulses required.

The third code from the bottom of Table II is code 12 (1100) and the corresponding number to be printed is 0.5. As the I counter is counted past positions 13 and 14, three pulses are added into PR2 so that in position 12 we must add two to obtain the total of five required.

The foregoing suggests the decoding mechanism of the invention in which the I counter is counted forward from whatever position it is in when the CTS step is entered, adding 1, 2, 3 or 5 counts to the P register, depending upon which code is showing in the I counter at the moment. However, there is one complication. In order to print 20.0, it would be necessary to add 200 pulses to PR2 which would take ten seconds or so, too long a period of time. If the P register is shifted to entry point for PR3, it would only be necessary to add 20 pulses. This is accomplished by making a shift-over at I counter code 8 (1000). As long as the I counter code is less than 8, pulses are added into PR3. When the code is larger than 8, they are added into PR2, remembering that PR2 carries to PR3. The K counter is used to select the proper entry point into the P register. This procedure is accomplished as follows.

The J counter is used to determine whether 1, 2, 3 or 5 pulses are to be added to the P register for any one position of the I counter, while the K counter controls which P register digit is counted forward. The $\overline{CTS}$–215 signal into the P-clock logic of FIG. 3E allows ATP–171 to be turned on, enabling the generation of $\overline{PAD}$–178 pulses. ATP–171 will remain true until the proper number of pulses has been counted into the P register and is only turned off when $\overline{FTS}$–216 (finish two sigma) goes false at the position following $\overline{Di14}$ in FIG. 3A. Either $\overline{DK2}$ or $\overline{DK3}$ is false, depending upon whether the I counter counted past position 8 or not during $2\sigma$ accumulation. These signals select which P register digit will receive the $\overline{PAD}$–178 pulses. Gate 212 in FIG. 3C has a false output due to $\overline{CTS}$ and $\overline{ACC}$ being false, false-enabling gate 214 above KR2. If $iR4$–213 should go true, that is, the I counter enters code 1000, the K counter will be advanced from position DK3 to position DK2.

PCL–217 pulses, which occur just as $\overline{PAD}$ goes true, are counted into the J counter via the input gate 218 which is false-enabled by CTS.

For any I counter position, one of the $\overline{Di}$ lines is false. These lines are connected to and control the gating which forms the input to CLN–127 monostable multivibrator in FIG. 3A. The gate 219 is enabled by either $\overline{Di7}$ or $\overline{Di13}$ going false since it is false-enabled and $\overline{CTS}$ into gate 220 is false. Accordingly, both $\overline{Di7}$ and $\overline{Di13}$ have to be true to pass "AND" gate 221 and have a true output from "OR" gate 220, which would inhibit gate 219. Table II indicates one pulse is to be added under these two conditions. If the J counter started counting from its initial state, the first pulse will advance it to state 011, setting JR2 true. This pulse, via gate 219, triggers CLN–127 (clear now monostable multivibrator) through gate 126. The "AND" gate 222, enabled when the I counter is in positions 5, 6, 11, 12 or 14 by the corresponding $\overline{Di}$ signals through gates 223 and 224, will pass the JR3 pulse which occurs after two pulses have been encountered into the J counter and P register. The gates 225 and 226 allow CLN–127 to be triggered after three and five pulses into the J counter and P register in a similar manner.

The $\overline{CLN}$–129 output signal, occurring as $\overline{CLN}$–130 input in FIG. 3C which is generated after 1, 2, 3 or 5 pulses have been counted into J and P, causes the J counter to be reset to its initial state 001 via the reset "NAND" gate 227. This reset action also generates the signal RJZ–228 (reset J to zero) which enters the I counter via the gate 229, which is false-enabled by $\overline{CTS}$, and the gate 113, causing the I counter to advance at the proper time.

The I counter is stepped along through all of its remaining positions, the P register counting along until the position after $\overline{Di14}$ in FIG. 3A is reached, which enables the $\overline{FTS}$ gate 230 in FIG. 3E, allowing it to go false. $\overline{FTS}$–216 false, allows the next C-clock pulse $\overline{CCL}$–231 to go through gate 230 and turn ATP–171 off, stopping the P-clock action.

The right five digits of the P register of FIG. 3D are then printed out and represent the $2\sigma$ value and the system is next prepared for the step of computing counts-per-minute, which is described in the aforementioned copending application Ser. No. 585,333.

Since the principles of the invention have now been made clear, modifications which are particularly adapted for specific situations without departing from those principles will be apparent to those skilled in the art. The appended claims are intended to cover such modifications as well as the subject matter described and to only be limited by the true spirit of the invention.

I claim:

1. In an automatic statistical percent error computing apparatus of the type used in measuring random events including a scaler for accumulating counts of the random events, the statistical percent error of which is to be classified in selected percent error ranges related to respective count boundaries which percent error ranges decrease in value as the number of counts increase, the improvement comprising:

a plurality of output connections from points in said scaler representative of the approximate count boundaries of said selected percent error ranges;

preset error pulse decoding means having an output and a first and second plurality of inputs, said first plurality of inputs being connected to said plurality of output connections of said scaler for deriving a preset error pulse at said output of said pulse decoding means each time the number of counts accumulated in said scaler reaches one of said boundaries;

a first (I) counter having an input and a multiplicity of outputs, said input being connected to said preset error pulse decoding means output for accumulating said preset error pulses to store a digital code representation of the current percent error range;

first counter decoding means having a multiplicity of inputs connected to said first counter multiplicity of outputs and having a multiplicity of outputs connected to said second plurality of inputs of said preset error pulse decoding means for preventing the generation of preset error pulses at said preset error pulse decoding means output more than once due to signals from any one combination of said output connections of said scaler;

output decoding means connected from said first counter multiplicity of outputs and having at least one output; and output means connected from said at least one output of said output decoding means for displaying or printing the current percent error range.

2. The apparatus of claim 1 in which said statistical error is the two-sigma error.

3. The apparatus of claim 1 in which at least a portion of said output decoding means comprises a converter for converting the various states of said first counter into a current proportional to a function of the relative positions of the instantaneous percent error range including diode gating and proportional resistors; and said display means is an ammeter.

4. The apparatus of claim 1 in which at least a portion of said output decoding means includes means for digital counting decoding.

5. The apparatus of claim 4 in which said at least a portion includes:

a source of clock pulses;

an output register having a plurality of digit counters;

a second (J) counter for controlling said counting decoding;

means for adding a preselected number of said clock pulses representative of the difference in output number required between the selected percent error range represented by the state of the first counter and the next lower of said ranges to said output register and to said second counter including gating decoding means connected to and controlled by the multiplicity of outputs of said first counter decoding means and connected to and controlled by said second counter to reset said second counter and to add a count to said first counter after adding said preselected number of pulses into said second counter and said output register; and said first counter decoding means and said gating decoding means also connected to add further preselected numbers of said clock pulses to said output register and to said first counter representative of the differences in output numbers required between said ranges corresponding to each subsequent state of said first counter until said first counter is counted through its final state and said output register contains the percent error value to be printed.

6. The apparatus of claim 4, in which said at least a portion includes:
a source of clock pulses;
an output register having a plurality of digit counters;
a second (J) counter for controlling said counting decoding;
a third (K) counter connected to said output register for selecting an entry point to one of said digit counters in said output register;
gating means connected from said first counter to said third counter to change the state of said third counter and said entry point to said output register in accordance with the content of said first counter;
means for adding a preselected number of said clock pulses representative of the difference in output number required between the selected percent error range represented by the state of the first counter and the next lower of said ranges to the digit of said output register enabled by said third counter and to said second counter including
gating decoding means connected to and controlled by the multiplicity of outputs of said first counter decoding means and connected to and controlled by said second counter to reset said second counter and to add a count to said first counter after adding said preselected number of pulses into said second counter and said output register; and
said first and second gating decoding means also connected to add further preselected numbers of said clock pulses to the enabled digit of said output register and to said first counter representative of the differences in output numbers required between said ranges corresponding to each subsequent state of said first counter until said first counter is counted through its final state and said output register contains the percent error value to be printed.

7. The apparatus of claim 5 further including at least one output register selection gate connected to said first counter and to said source of clock pulses for adding said preselected number of said clock pulses to a particular one of said plurality of digit counters of said output register until said first counter traverses a predetermined count which operates said at least one output register selection gate to add said clock pulses to another one of said plurality of digit counters thereby minimizing the number of pulses required to advance the output register to a given reading.

References Cited
UNITED STATES PATENTS 3,150,253    9/1964    Spergel _____ 235—151
3,160,740    12/1964    Mann et al. _____ 235—92

MAYNARD R. WILBUR, Primary Examiner

R. F. GNUSE, Assistant Examiner

U.S. Cl. X.R.

328—108